(12) United States Patent
Lee et al.

(10) Patent No.: US 12,673,834 B2

(45) Date of Patent: Jul. 7, 2026

(54) AUTOMATIC SUPPLY APPARATUS FOR FOOD-INGREDIENT STORAGE CONTAINER

(71) Applicant: SHINSTARR PRESENTS CORP., Seoul (KR)

(72) Inventors: Sangrok Lee, Seoul (KR); Jeon Ho Cha, Incheon (KR)

(73) Assignee: SHINSTARR PRESENTS CORP, Seoul (KR)

( * ) Notice: Subject to any disclaimer, the term of this patent is extended or adjusted under 35 U.S.C. 154(b) by 214 days.

(21) Appl. No.: 18/771,842

(22) Filed: Jul. 12, 2024

(65) Prior Publication Data

US 2025/0223116 A1 Jul. 10, 2025

(30) Foreign Application Priority Data

Jan. 8, 2024 (KR) ......................... 10-2024-0002918

(51) Int. Cl.
*B65G 47/90* (2006.01)
(52) U.S. Cl.
CPC ................................... *B65G 47/90* (2013.01)
(58) Field of Classification Search
CPC ........ B65G 17/12; B65G 17/30; B65G 17/32; B65G 21/209; B65G 47/8815; B65G 47/90; B65G 47/901; B65G 2201/0235; B65G 2812/02762; G07F 11/165; G07F 11/26
See application file for complete search history.

(56) References Cited

U.S. PATENT DOCUMENTS

| | | | |
|---|---|---|---|
| 2008/0148801 A1* | 6/2008 | Olson | B21D 51/2615 72/426 |
| 2008/0155985 A1* | 7/2008 | Labrador | F01K 27/00 60/698 |
| 2008/0283070 A1* | 11/2008 | Jacobi | G01G 13/08 131/286 |

FOREIGN PATENT DOCUMENTS

| | | |
|---|---|---|
| KR | 10-0472767 B1 | 2/2005 |
| KR | 10-2006-0001843 A | 1/2006 |
| KR | 10-1016051 B1 | 2/2011 |

* cited by examiner

*Primary Examiner* — Saul Rodriguez
*Assistant Examiner* — Brendan P Tighe
(74) *Attorney, Agent, or Firm* — Stein IP, LLC

(57) ABSTRACT

An automatic supply apparatus for a food-ingredient storage container includes an infinite track unit including a chain or a belt (hereinafter, collectively referred to as 'the chain'), multiple holders configured to be connected to the chain and to move together with the chain, with multiple holders allowing storage containers to be respectively seated therein, a holding part formed on each of the holders, a gripper configured to be capable of gripping each of the storage containers seated by the holder, a robot arm configured to move the gripper in a first direction and in a direction (hereinafter, referred to as 'a second direction') opposite to the first direction, and a suspensor formed on the gripper and configured to move together with the gripper, wherein the suspensor is held by the holding part when the gripper moves in the second direction while the gripper grips the storage container.

10 Claims, 7 Drawing Sheets

80

89        87

85

83

80

87

AUTOMATIC SUPPLY APPARATUS FOR FOOD-INGREDIENT STORAGE CONTAINER

CROSS REFERENCE TO RELATED APPLICATION

The present application claims priority to Korean Patent Application No. 10-2024-0002918, filed Jan. 8, 2024, the entire contents of which are incorporated herein for all purposes by this reference.

BACKGROUND OF THE INVENTION

Field of the Invention

The present disclosure relates generally to an apparatus for automatically supplying containers. More particularly, the present disclosure relates to an apparatus which automatically takes out a storage container containing cooking ingredients for an ordered food and supplies the storage container to a cook such as a person or robot when the person or robot starts cooking food according to the order of a customer.

Description of the Related Art

Currently, automation technology is increasingly being applied in many industrial fields, and its scope of application is rapidly expanding. In the field of food cooking, interest in automation of cooking is increasing to solve problems caused by continuous increases in labor costs.

Prior arts concerning a prior automatic container supply apparatus include prior arts disclosed in Korean Patent No. 10-0472767, Korean Patent No. 10-1016051, and Korean Patent Application Publication No. 10-2006-0001843.

The prior automatic container supply apparatus provides a method of withdrawing a container located at a lowest side downward, one by one, to be used after stacking several containers in a height direction as a technology that can be applied to single menu items such as cup noodles and lightweight containers made of Styrofoam or plastic.

However, in the case of a storage container containing food ingredients suitable for various types of dishes, it is general that the weight of the container is relatively heavy and the container is made of a sturdy metal material.

When an automatic container supply apparatus takes out and supplies storage containers containing various food ingredients in the same way as the prior automatic container supply apparatus (i.e., stacking containers in a height direction and withdrawing the lowest container) for cooking food of various menus, there is a problem in that due to the weight of the storage containers, repeated impacts are applied to drive parts (e.g., links, rods, and support pins, etc.), causing apparatus failure when the apparatus is used for long periods of time.

In addition, when applying a prior automatic container supply method especially to an automatic cooking system using a robot, there is limitation in implementing the operation of the robot arm easily gripping and withdrawing a storage container and then delivering the storage container to a cook.

Meanwhile, to solve this problem, when applying the method of arranging food-ingredient storage containers horizontally and sequentially transporting and withdrawing the containers by using a conveyor device, multiple conveyor devices are required to be provided in order to stack a large number of storage containers. In this case, a power device including a separate drive motor is required to be installed for each of the conveyor devices, thereby greatly increasing costs.

Documents of Related Art (Patent Document 1) Korean Patent No. 10-0472767 (registered on Feb. 12, 2005)
(Patent Document 2) Korean Patent No. 10-1016051 (registered on Feb. 11, 2011)
(Patent Document 3) Korean Patent Application Publication No. 10-2006-0001843 (published on Jan. 6, 2006)

SUMMARY OF THE INVENTION

Accordingly, the present disclosure has been made keeping in mind the above problems occurring in the related art, and the present disclosure is intended to propose an automatic supply apparatus for a food-ingredient storage container which automatically takes out and supplies food-ingredient storage containers by arranging the food-ingredient storage containers in a horizontal direction and pulling out the containers sequentially instead of stacking the food-ingredient storage containers in a height direction and pulling out each food-ingredient storage container at a lowest end.

In addition, the present disclosure is intended to propose an automatic supply apparatus for a food-ingredient storage container, in which when starting to cook food according to the order of a customer, a robot arm can pull out and move a container containing ingredients of the corresponding ordered food by easily and accurately gripping the container, and further, each of storage containers can automatically and sequentially be transferred to a position at which a robot can grip the storage container more efficiently.

Furthermore, the present disclosure is intended to propose an automatic supply apparatus for a food-ingredient storage container, in which storage containers containing food ingredients are moved in the method of transferring the containers by a conveyor and pulled out, and particularly, even if a power device for the operation of the conveyor, such as a drive motor, is separately installed on the conveyor, the infinite-track-type rotation of the conveyor is automatically triggered in the process of pulling out the storage containers.

In order to achieve the objectives of the present disclosure, there is provided an automatic supply apparatus for a food-ingredient storage container of the present disclosure, the apparatus including: an infinite track unit comprising a chain or a belt (hereinafter, collectively referred to as 'the chain') configured to be capable of performing a rotational movement in an infinite track manner; multiple holders configured to be connected to the chain and to move together with the chain, with multiple holders allowing food-ingredient storage containers to be respectively seated therein; a holding part formed on each of the holders; a gripper configured to be capable of gripping each of the food-ingredient storage containers seated by the holder; a robot arm configured to move the gripper in a first direction and in a second direction; and a suspensor formed on the gripper and configured to move together with the gripper, wherein the suspensor is held by the holding part when the gripper moves in the second direction while the gripper grips the food-ingredient storage container.

The holder is configured to be forcibly moved in the second direction by an external force applied to the holding part by the suspensor when the suspensor moves in the second direction while the suspensor is held by the holding part.

The chain is configured such that the rotational movement of the chain is generated in conjunction with the movement of the holder in the second direction during the movement of the holder in the second direction.

The suspensor is configured such that the holding operation of the suspensor is released when the holder moves in the second direction and reaches a specific point.

According to an embodiment of the present disclosure, the holding part may include a holding protrusion protruding from a side of the holder in a form of a protrusion.

In this case, the suspensor may be configured such that the holding operation of the suspensor is performed by the holding protrusion when the gripper moves in the second direction while the gripper grips the food-ingredient storage container.

The holder may be configured to be forcibly moved in the second direction by an external force applied to the holding protrusion by the suspensor when the suspensor moves in the second direction while the suspensor is held by the holding protrusion.

According to an embodiment of the present disclosure, the suspensor may include: a body part formed as a structure extending downward from one region of the gripper and allowing the holding operation to be performed by the holding protrusion; and a holding-release groove formed in a lower portion of the body part in a form of a long groove through which the holding protrusion is capable of passing.

In this case, the holding protrusion may be configured to be in a state in which the holding protrusion is capable of passing through the holding-release groove when the holder reaches the specific point.

The suspensor may be configured to move in the second direction while the holding operation of the suspensor is released since the holding protrusion passes through the holding-release groove when the holder reaches the specific point.

The specific point may be a point located in a region in which the holder completes a horizontal movement of the second direction caused by the suspensor and moves downward. According to the automatic supply apparatus for a food-ingredient storage container according to the present disclosure, it is possible to take out food-ingredient storage containers automatically in the method of arranging the containers horizontally and withdrawing the containers sequentially instead of the method of stacking the containers in a height direction and withdrawing a container on the lowest end, thereby enabling a robot arm to withdraw and move a container containing food ingredients by gripping the container easily and accurately when starting to cook food.

Accordingly, when there is an order from a customer, a container containing food ingredients for cooking a corresponding ordered food can be automatically taken out and moved to be supplied to a cook such as a person or robot, thereby enabling the corresponding ordered food to be rapidly cooked and supplied, and significantly decreasing manpower for food cooking.

Meanwhile, in order to ensure that food-ingredient storage containers can be sequentially and automatically transferred to a position at which a robot can most efficiently grip a storage container, it is most advantageous to move the food-ingredient storage containers in the method of using conveyors. However, in order to operate the conveyors, it is generally necessary to install a power device, including a drive motor, in each of the conveyors.

However, according to the present disclosure, even if a drive motor is not installed separately on each conveyor, the infinite-track-type rotation of a conveyor (i.e., a chain) (i.e., the continuous movement of storage containers) may be automatically triggered in the process of withdrawing food-ingredient storage containers, thereby significantly reducing apparatus manufacturing costs.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Terms used in this specification are merely used to describe specific embodiments and are not intended to limit the present disclosure. Singular expressions include plural expressions unless the context clearly dictates otherwise. In this specification, terms such as "comprise" or "have" are intended to designate the presence of a feature, a number, a step, an operation, a component, a part, or combination thereof described in the specification, but are not intended to preclude the possibility of the presence or addition of one or more other features, numbers, steps, operations, components, parts, or combinations thereof.

In addition, in this specification, "on or above" means located above or below a target portion, and does not necessarily mean the location of an upper side in the direction of gravity. That is, "on or above" as used herein includes not only the case of being located above or below a target portion, but also the case of being located in front of or behind the target portion.

Additionally, when a part of a region or plate, etc. is described to be "on or above" another part, this does not only mean a case in which the part is in contact with the another part "directly on or above" the another part or at a distance from the another part, but also a case in which there is still another part therebetween.

In addition, in this specification, when a component is described to be "connected" or "bonded" to another component, it should be understood that the component may be directly connected or directly bonded to the another component, and the component may be connected or bonded to the another component through still another component therebetween unless there is a special statement to the contrary.

Additionally, in this specification, terms such as first and second may be used to describe various components, but the components should not be limited by the terms. The terms are used only for the purpose of distinguishing one component from another.

Hereinafter, various embodiments, advantages and features of the present disclosure will be described in detail with reference to the attached drawings.

Figure 1:
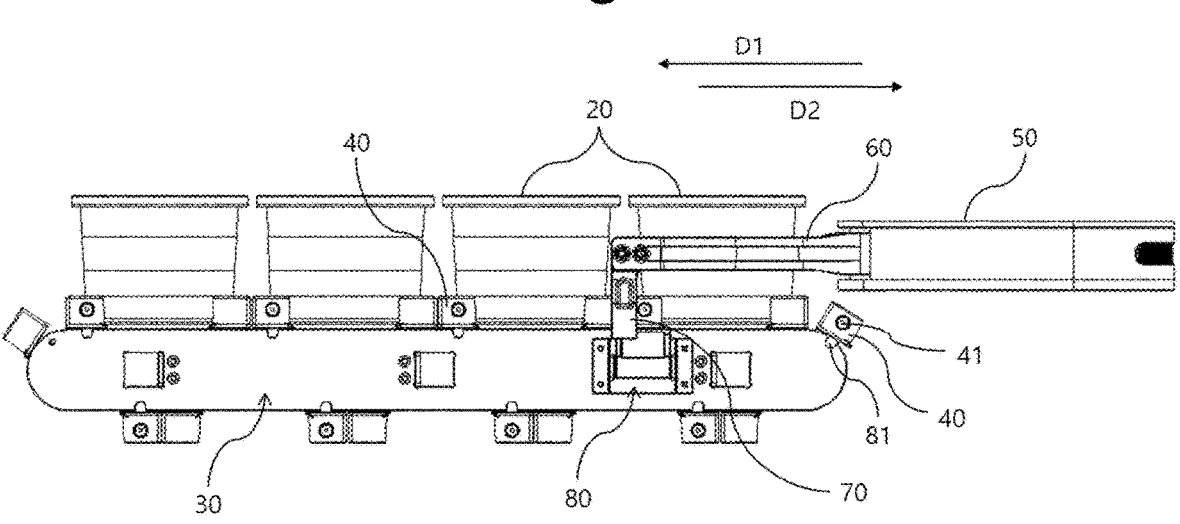
FIG. 1 is a side view of a suspensor of an automatic supply apparatus for a food-ingredient storage container according to the present disclosure when the suspensor is held by a holding protrusion.
Figure 2:
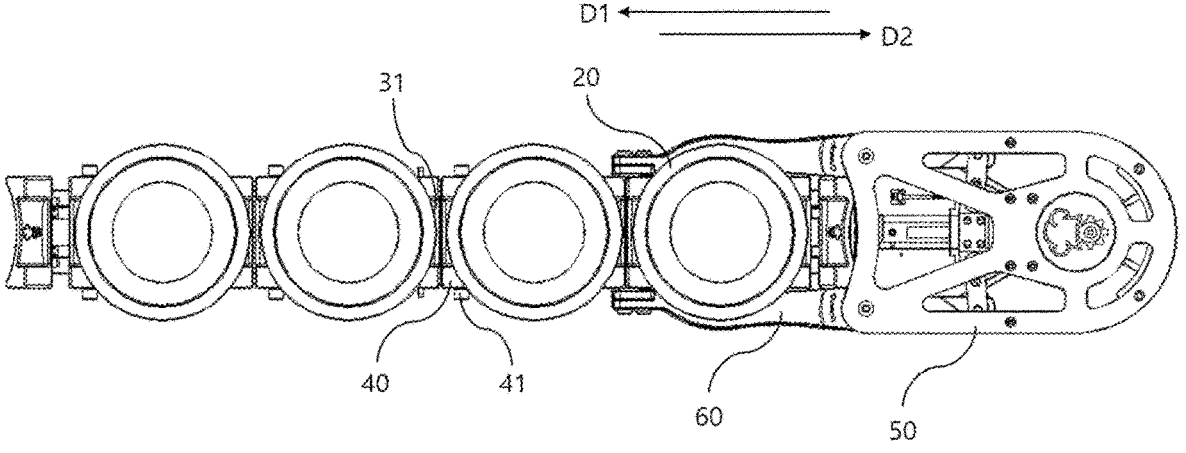
FIG. 2 is a plan view of FIG. 1.
Figures 3, 4:
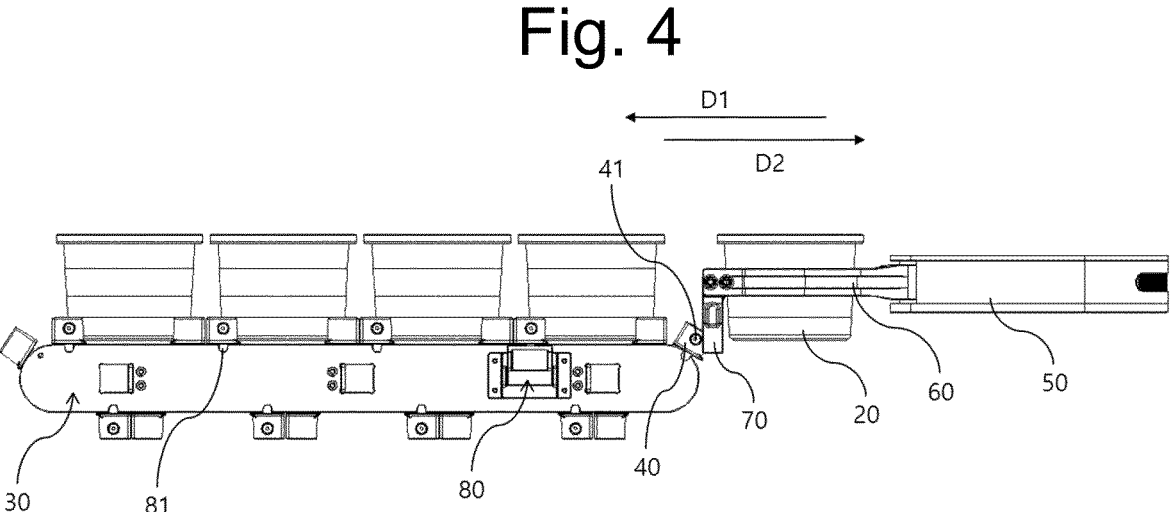
FIG. 3 is a front view of FIG. 1.
FIG. 4 is a side view of a state in which the holding operation of the suspensor is released when the suspensor of the automatic supply apparatus for a food-ingredient storage container according to the present disclosure reaches a specific point.
Figure 5:
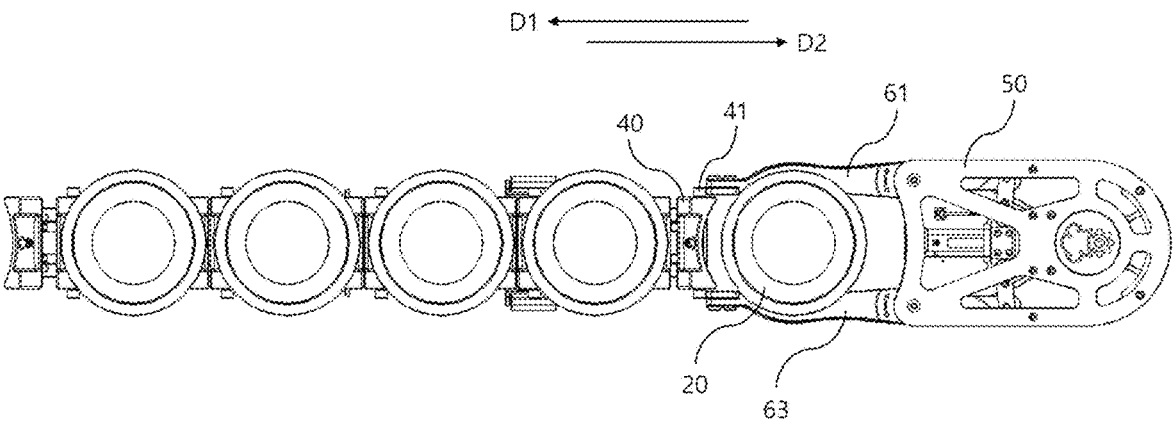
FIG. 5 is a plan view of FIG. 4.
Figure 6:
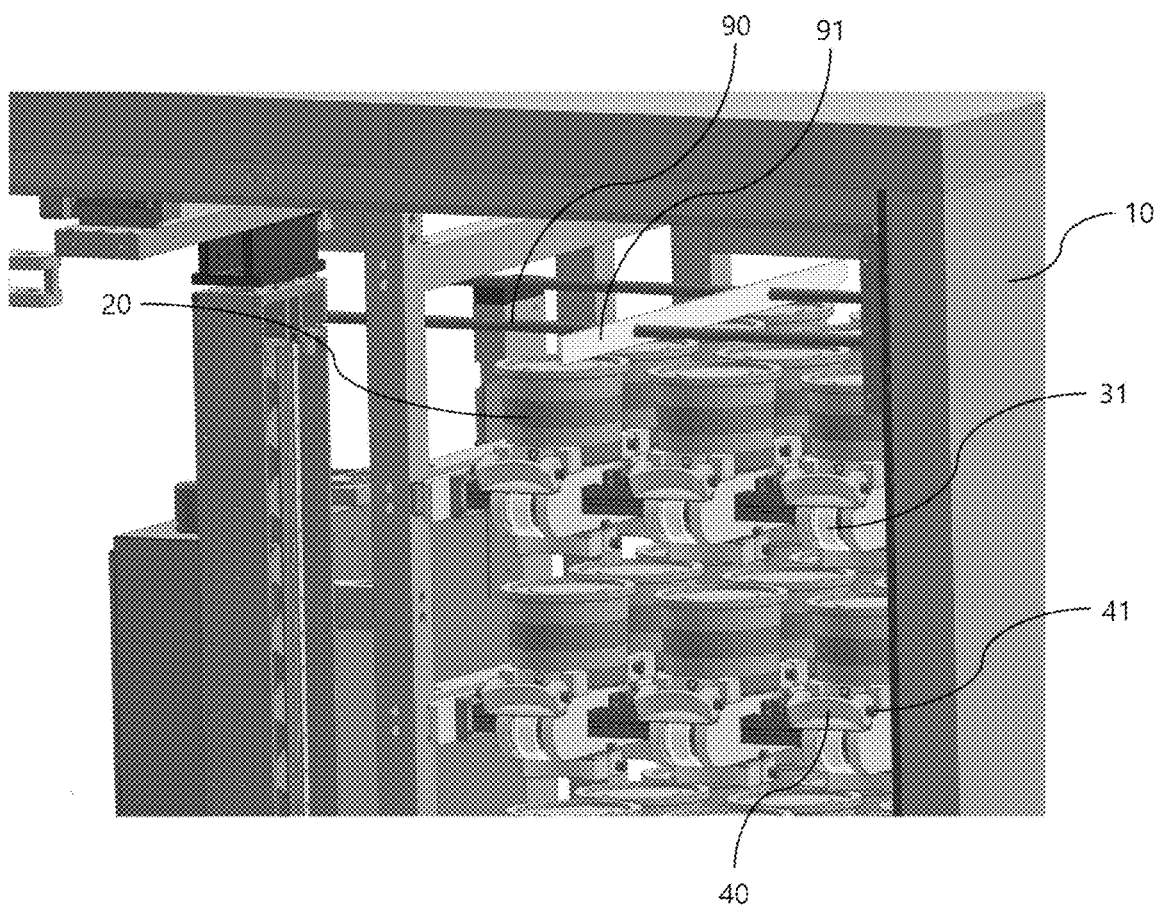
FIG. 6 is a perspective view illustrating an inlet of a main body according to the present disclosure and the internal structure of the main body.
Figures 7, 8:
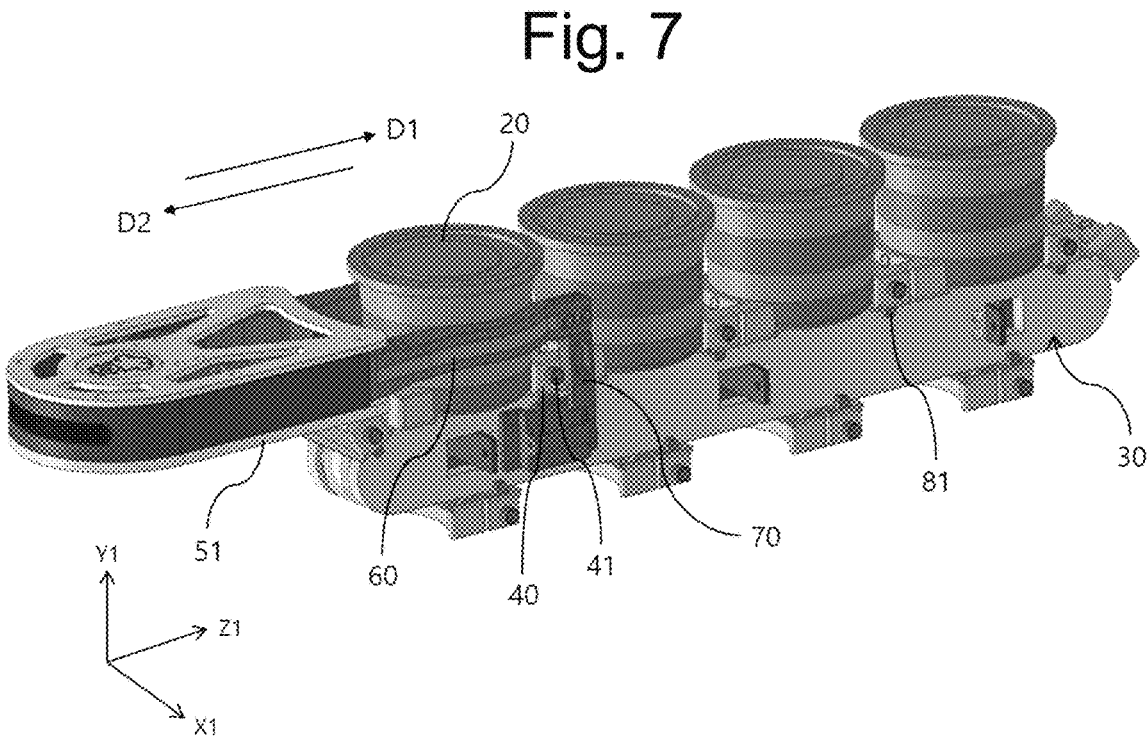
FIG. 7 is a perspective view of a state in which the suspensor of the automatic supply apparatus for a food-ingredient storage container according to the present disclosure is held by the holding protrusion.
FIG. 8 is a perspective view of a state in which the holding operation of the suspensor is released when the suspensor of the automatic supply apparatus for a food-ingredient storage container according to the present disclosure reaches a specific point.
Figures 9, 10:
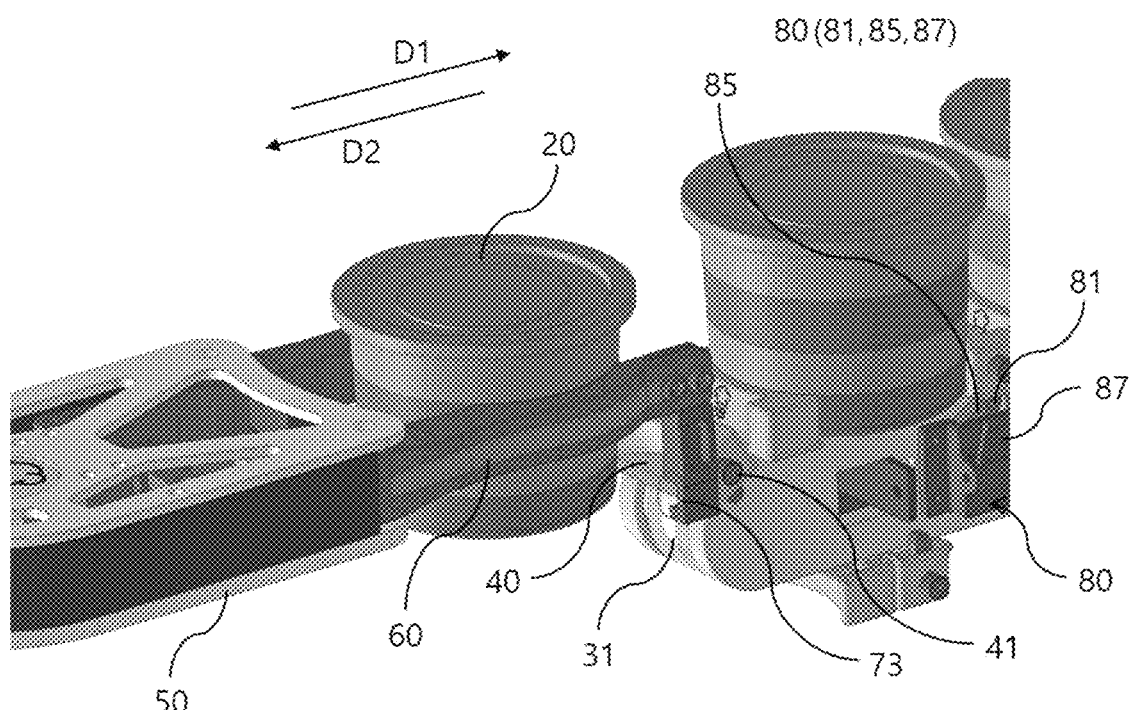
FIG. 9 is a partially enlarged view of FIG. 8.
FIG. 10 is a perspective view of a state in which the food-ingredient storage container is completely withdrawn by the automatic supply apparatus for a food-ingredient storage container according to the present disclosure.

FIG. 1 is a side view of a suspensor of an automatic supply apparatus for a food-ingredient storage container according to the present disclosure when the suspensor is held by a holding protrusion; FIG. 2 is a plan view of FIG. 1; FIG. 3 is a front view of FIG. 1; FIG. 4 is a side view of a state in which the holding operation of the suspensor is released when the suspensor of the automatic supply apparatus for a food-ingredient storage container according to the present disclosure reaches a specific point; FIG. 5 is a plan view of FIG. 4; FIG. 6 is a perspective view illustrating an inlet of a main body according to the present disclosure and the internal structure of the main body; FIG. 7 is a perspective view of a state in which the suspensor of the automatic supply apparatus for a food-ingredient storage container according to the present disclosure is held by the holding protrusion; FIG. 8 is a perspective view of a state in which the holding operation of the suspensor is released when the suspensor of the automatic supply apparatus for a food-ingredient storage container according to the present disclosure reaches a specific point; FIG. 9 is a partially enlarged view of FIG. 8; and FIG. 10 is a perspective view of a state in which the food-ingredient storage container is completely withdrawn by the automatic supply apparatus for a food-ingredient storage container according to the present disclosure.

Referring to FIGS. 1 to 10, the automatic supply apparatus for a food-ingredient storage container according to the present disclosure is an apparatus which automatically takes out a storage container 20 containing cooking ingredients for an ordered food and supplies the storage container to a cook such as a person or robot when the person or robot starts cooking food according to the order of a customer. The automatic supply apparatus may include a main body 10, an infinite track unit 30, a holder 40, a holding part 41, a robot arm 50, a gripper 60, a suspensor 70, and a stopping unit 80, and preferably may further include a removal prevention unit.

The main body 10 of the present disclosure constitutes the exterior of the automatic supply apparatus for a food-ingredient storage container, and is a box-shaped structure that seals an internal space thereof from the outside. The main body 10 has space provided therein to accommodate the infinite track unit 30, the holder 40, the robot arm 50, and the gripper 60.

An inlet is formed to be open in one region of the main body 10 to bring the storage container 20 containing food ingredients into the internal space of the main body 10, and an outlet is formed to be open in another region of the main body 10 to take out a food-ingredient storage container 20 provided the internal space of the main body 10 to the outside.

The outlet, which is a region at which a specific storage container 20 withdrawn from the holder 40 by the taking-out operation of the gripper 60 arrives, may be formed in the form of an opening communicating with the outside. Accordingly, when the storage container 20 containing ingredients that meet the order of a customer is withdrawn from the holder 40 by the robot arm 50 and located in the outlet region, the corresponding storage container 20 may be taken out of the main body 10. In addition, another robot arm not shown) may receive the ingredients contained in the corresponding storage container 20 and may cook according to the corresponding order.

Meanwhile, the outlet and the inlet may be configured to be opened and closed by the opening and closing operations of separate opening and closing doors. Each of the opening and closing doors may be configured in a known type, such as a sliding door or a hinged rotating door equipped with a locking device.

The infinite track unit 30 of the present disclosure is a mechanism module including a chain or a belt (hereinafter, collectively referred to as 'a chain 31') that is configured to rotationally move in an infinite track manner.

According to an embodiment, the infinite track unit 30 may include the chain 31, a first pulley 33, a second pulley (not shown), and a guide roller (not shown). In this case, the first pulley and the second pulley are arranged in a structure facing each other at a distance from each other, wherein the first pulley 33 may be installed in a region closer to the robot arm 50 than the second pulley, and the second pulley may be installed in a region farther from the robot arm than the first pulley 33.

In addition, the chain 31 rotationally moves in the infinite track manner by using the first pulley 33 and the second pulley installed on opposite ends thereof.

In addition, the guide roller may be configured as a rotating body or a rotating rod that supports the chain which axially rotating at the lower side of the chain 31 to prevent the sagging of the chain 31 and ensure an efficient rotational movement thereof.

According to an embodiment, the infinite track unit 30 may include multiple infinite track units installed in multiple rows by being spaced apart from each other. Furthermore, the infinite track unit 30 may include multiple infinite track units installed in a multi-layer structure.

For example, a storage container containing a first food ingredient may be arranged on an infinite track unit on each of first, second, and third floors in a first row, a storage container containing a second food ingredient may be arranged on an infinite track unit on each of first, second, and third floors in a second row, and a storage container containing a third food ingredient may be arranged on an infinite track unit on each of first, second, and third floors in a third row.

The robot arm 50 of the present disclosure is a mechanical device that moves the gripper 60 in multiple directions including a first direction D1 and a second direction D2, which will be described later, and may include a mechanism module having multiple axial degrees of freedom. According to an embodiment, the robot arm 50 may be configured to perform a reciprocating movement in an X-axis direction X1, a reciprocating movement in a Y-axis direction Y1, a reciprocating movement in a Z-axis direction Z1, and an axial rotation.

Here, the 'Y-axis direction Y1' may refer to a height direction (a vertical direction) of the main body 10, the 'X-axis direction X1' may refer to a direction perpendicular to the Y-axis direction Y1, that is, a transverse direction (a horizontal direction) of the main body, and the 'Z-axis direction Z1' may refer to a direction orthogonal to the X-axis direction and Y-axis direction, that is, a direction parallel to the longitudinal direction of the chain 31 or the arrangement direction of the storage container 20 to be described later.

In addition, the axial rotation of the robot arm 50 may include a movement ratable clockwise and counterclockwise about a rotational axis parallel to the Y-axis direction Y1.

The gripper 60 of the present disclosure, which is a mechanism module configured to grip the food-ingredient storage container 20 seated in the holder 40, is mounted to the robot arm 50, wherein the movement of the gripper 60 is controlled according to the multi-axis directional movement of the robot arm 50. That is, the gripper 60 is configured to move freely in the X-axis, Y-axis, and Z-axis directions together with the robot arm 50.

Particularly, the gripper 60 is configured to be moved in the first direction D1 and in the second direction D2 by the robot arm 50.

Here, 'the first direction D1' refers to a direction approaching the storage container 20 seated by the holder 40 among the Z-axis reciprocating movement directions Z1 of the robot arm 50, and 'a movement in the first direction D1' refers to moving straight (i.e. moving forward) in the first direction D1. In addition, 'the second direction D2', which is an opposite direction to the first direction D1, refers to a direction gradually being away from the storage container 20 seated by the holder 40 among the Z-axis reciprocating movement directions Z1 of the robot arm 50, and 'a movement in the second direction D2' refers to moving straight (i.e., moving rearward) in the second direction D2.

According to an embodiment, the gripper 60 may be formed in the shape of pincers. That is, the gripper 60 may include a right pincer 61 and a left pincer 63, which are arranged in a structure opposing each other so that the right pincer 61 and the left pincer 63 respectively perform axial rotations to perform movements increasing a distance therebetween and movement decreasing the distance. In this case, after the right pincer 61 and the left pincer 63 approach the food-ingredient storage container 20 while the distance is increased, the right pincer 61 and the left pincer 63 may decrease the distance therebetween to press and grip the corresponding storage container 20.

The holder 40 of the present disclosure is configured to be connected to the chain 31 of the infinite track unit 30 to move together with the chain 31, and is a member which allows the food-ingredient storage container 20 to be seated inside the main body 10.

According to an embodiment, the holder 40 may be configured to include a pair of a first holder and a second holder facing each other. In this case, the first holder and the second holder may be arranged at an interval from each other and may be configured so that at least the lower end part of the food-ingredient storage container 20 is inserted into and seated in space between the first and second holders.

According to an embodiment, the holder 40 may be mounted on the chain 31 by being attached or fastened to the chain 31 through a coupling member or fastening means formed on the lower surface of the holder 40.

Accordingly, when the holder 40 coupled to the chain 31 is forcibly moved by an external force, the chain 31 connected to the holder 40 also rotates in conjunction with the movement of the holder 40.

Meanwhile, the holder 40 may include multiple holders, and the multiple holders 40 may be installed by being arranged along the longitudinal direction of the chain 31. In this case, multiple storage containers 20 are seated in pairs of multiple holders 40, respectively, and are placed by being arranged side by side on the chain 31 along the longitudinal direction of the chain 31 as a whole.

The holding part 41 of the present disclosure is formed on at least a surface of the holder 40 and is a component to cause the movement of the holder 40 in the second direction D2 by using an external force (i.e., the pulling force of the robot arm 50) when performing the movement of the gripper 60 in the second direction D2 described above (that is, rearward movement). The holding part 41 is configured such that the suspensor 70 to be described later is held by holding part 41.

Specifically, when the suspensor 70 moves in the second direction D2 while the suspensor 70 is held by the holding part 41, the external force of the second direction D2 is applied to the holding part 41 by the suspensor 70, and the holder 40 formed integrally with the holding part 41 is configured to be forcibly moved in the second direction D2 by such an external force.

In addition, in this way, when the holder 40 is forcibly moved in the second direction D2, the chain 31 coupled to the holder 40 also rotates in conjunction with the movement of the holder 40 in the second direction D2.

According to an embodiment, the holding part 41 may include the holding protrusion that protrudes in the form of a protrusion on the side of the holder 40. For reference, in the case of the embodiment of FIGS. 1 to 9, the holding protrusion is configured to correspond to the holding part 41. Accordingly, in FIGS. 1 to 9, each of the holding protrusion and the holding part is given the same reference numeral (i.e., '41').

In this case, the holding protrusion 41 is preferably formed in a shape having a circular cross-section so that the operation of releasing the holding state of the suspensor 70 to be described later can be occur efficiently. For example, the holding protrusion 41 may be formed into a cylindrical shape.

According to an embodiment, the holding part 41 may include a first holding protrusion that protrudes from the left side of the holder 40 and a second holding protrusion that protrudes from the right side of the holder 40.

In this case, when first and second suspensors 70 to be described later move in the second direction D2 described above while the first and second suspensors 70 are held by first and second holding protrusions 41, respectively, the holder 40 is forcibly moved in the second direction D2 by external forces applied to the first and second holding protrusions 41.

Meanwhile, as an extended embodiment, the holding part 41 may further include other components in addition to the holding protrusion.

The suspensor 70 of the present disclosure is a member formed on the gripper 60 to move together with the gripper 60.

When the gripper 60 performs a movement in the second direction D2 (i.e., the rearward movement) described above while the gripper 60 grips the food-ingredient storage container 20 seated in the holder 40, the suspensor 70 is configured to be held by the holding part 41 formed on the corresponding storage container 20.

In addition, the suspensor 70 is configured so that the holding operation of the suspensor 70 is released by the holding part 41 removing from the suspensor 70 when the holder 40 moves in the second direction D2 and reaches a specific point.

According to an embodiment, the suspensor 70 may include a body part 71 and a holding-release groove 73.

The body part 71 of the suspensor 70 is formed by extending downward from a region of the gripper 60 and is a member held in contact with the holding protrusion 41 during the movement of the gripper 60 in the second direction D2 described above.

According to an embodiment, the body part 71 of the suspensor 70 is coupled and fixed to one end part of the gripper 60 and may be formed in an approximately rectangular parallelepiped shape extending from the one end part in a vertical downward direction.

The holding-release groove 73 of the suspensor 70 is a component formed in the form of a long groove on the lower end part of the body part 71 and functions to allow the suspensor 70 to be released from the state of the suspensor 70 held by the holding protrusion 41 when the holder 40 moves in the second direction D2 and reaches a specific point.

The holding-release groove 73 is formed to have a size, a shape and a structure that allow the holding protrusion 41 to pass through the holding-release groove 73. For example, when the holding protrusion 41 has a cylindrical shape, the holding-release groove 73 may be formed in the form of a long groove having a width greater than the diameter of the circular cross-section of the holding protrusion 41.

According to an embodiment, the holding-release groove 73 is formed in the form of a long groove extending in the transverse direction of the body part (i.e., a direction parallel to the Z-axis direction Z1) on the lower portion of the body part, wherein a first end of the long groove may have a first opening formed to be open, and a second end thereof may have a second opening formed to be open.

In this case, when the holder 40 moves further in the second direction D2 after reaching the above-mentioned specific point, the holding protrusion 41 moves into the holding-release groove 73 through the first opening of the holding-release groove 73, passes through the inside of the holding-release groove 73, and then moves out of the holding-release groove 73 through the second opening.

Meanwhile, the suspensor 70 may include a pair of suspensors. That is, the suspensor 70 may include a first suspensor 70 formed on the right pincer 61 of the gripper 60 and a second suspensor formed on the left pincer 63. In this case, the first suspensor 70 is configured to be held by the first holding protrusion 41, and the second suspensor is configured to be held by the second holding protrusion.

Hereinafter, the operation of the suspensor 70 being released from the holding state thereof through the holding-release groove 73 described above will be described in detail.

The holding protrusion 41 is in a state in which the holding protrusion 41 may pass through the holding-release groove 73 when the holder 40 reaches a specific point.

In addition, when the holder 40 reaches the specific point, the holding protrusion 41 may pass through the holding-release groove 73, and thus the suspensor 70 may move in the second direction D2 while the holding operation of the suspensor 70 is released.

In addition, when the holding operation of the suspensor 70 is released, the holder 40 and the chain 31 do not move and remain stationary even if the suspensor 70 continues to move in the second direction D2.

Hereinafter, a point (i.e., the above-described specific point) at which the holding state of the suspensor 70 is released will be described in detail.

When the holder 40, which supports the storage container 20, moves in the second direction D2 and reaches one end part of the infinite track unit 30 (i.e., a point at which the chain 31, which is moving horizontally, moves rotationally), the chain 31 is moved rotationally by the first pulley 33, and accordingly, the holder 40 coupled to the chain 31 also starts moving downward. According to an embodiment, the one end part may be a region at which the first pulley 33 is located.

Hereinafter, any one point located within a region in which the chain 31 switches from a horizontal movement to a rotational movement will be referred to as a 'holding-release point'.

In this case, when the holder 40 moves downward, the holding protrusion (i.e., the holding protrusion by which the suspensor is held) formed on the holder 40 is in a state in which the holding protrusion is capable of passing through the holding-release groove 73.

When the gripper 60 moves further in the second direction D2 after the holder 40 reaches the holding-release point, the holding protrusion 41 passes through the holding-release groove 73, and thus the suspensor 70 moves in the second direction D2 while the holding operation thereof is released.

After all, the specific point referred to in the present disclosure may be the holding-release point described above, and may be a point at which the holder 40 completes the horizontal movement in the second direction D2 caused by the suspensor 70 and moves downward while rotating along the rotational movement trajectory of the chain 31.

In other words, the specific point referred to in the present disclosure may be a point located within a region in which the holder 40 switches to a rotational downward movement after the holder 40 is moved horizontally by the suspensor 70.

Figure 11:
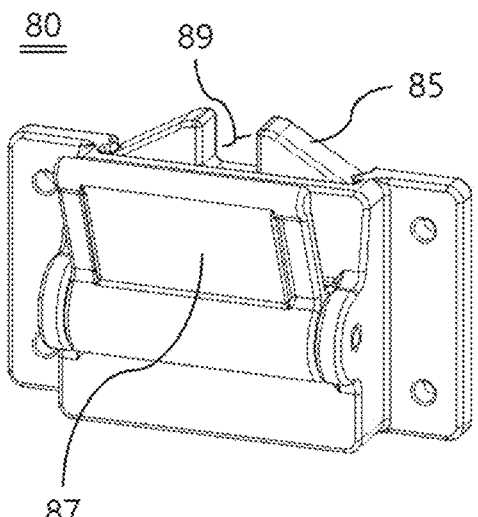
FIG. 11 is a perspective view of a state in which the holder of a stopping unit according to the present disclosure is stopped.
Figure 12:
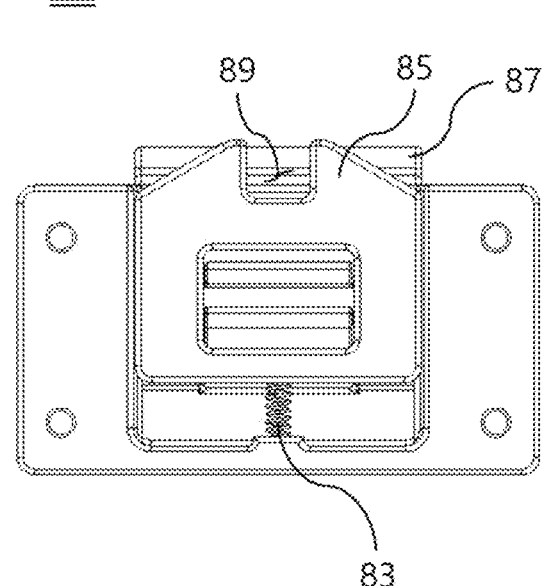
FIG. 12 is a rear view of FIG. 11.
Figure 13:
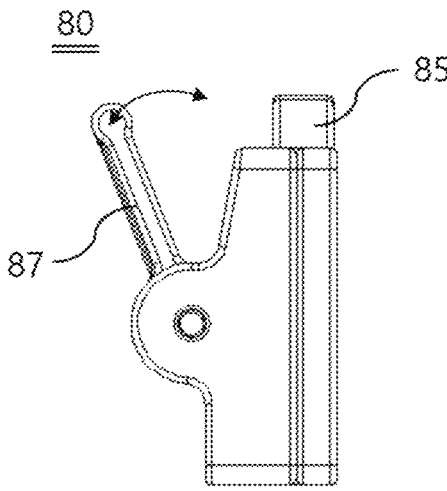
FIG. 13 is a side view of FIG. 11.
Figure 14:
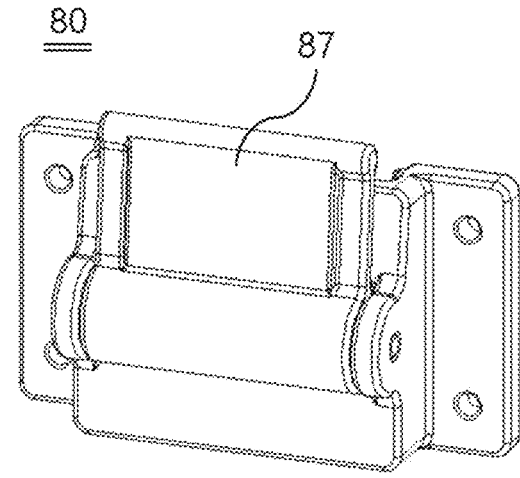
FIG. 14 is a perspective view of a state in which the stopping of the holder is released when a lever of the stopping unit according to the present disclosure is pressed by the suspensor.
Figures 15, 16:
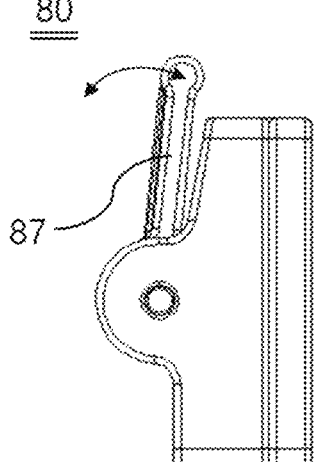
FIG. 15 is a rear view of FIG. 14.
FIG. 16 is a side view of FIG. 14.

FIG. 11 is a perspective view of a state in which the holder of a stopping unit according to the present disclosure is stopped; FIG. 12 is a rear view of FIG. 11; FIG. 13 is a side view of FIG. 11; FIG. 14 is a perspective view of a state in which the stopping of the holder is released when a lever of the stopping unit according to the present disclosure is pressed by the suspensor; FIG. 15 is a rear view of FIG. 14; and FIG. 16 is a side view of FIG. 14.

Referring to FIGS. 11 to 14, the stopping unit 80 of the present disclosure stops the holder 40 so that the holder 40 does not arbitrarily move or shake due to external impacts when the food-ingredient storage container 20 is in a standby state without being taken out, and automatically releases the stopping state of the holder 40 when the withdrawal of the storage container 20 is performed to start cooking.

According to an embodiment, the stopping unit 80 may include a stopping piece 81, an elastic body 83, a stopper 85, and a lever 87.

The stopping piece 81 of the stopping unit is a member that protrudes in the form of a protrusion on the lower surface of the holder 40. According to an embodiment, the stopping piece 81 may be formed in the shape of a rod extending vertically downward from the right or left region of the lower surface of the holder 40.

The elastic body 83 of the stopping unit is elastically compressed when an external force is applied thereto, and is elastically restored when the external force is removed. For example, the elastic body 83 may be a coil spring or a leaf spring.

The stopper 85 of the stopping unit is configured to cause the holding state of the stopping piece 81 and prevent the holder 40 from moving in the first direction and the second direction D2.

According to an embodiment, the stopper 85 may be formed in a pincer shape with a holding groove 89 having a groove structure. In this case, when the stopping piece 81 is inserted into the holding groove 89, the holder 40 which is held by the stopper 85 and is coupled to the corresponding stopping piece 81 is prevented from moving or shaking arbitrarily due to external impacts.

In addition, when the withdrawal of the storage container 20 is performed to start cooking, the stopping piece 81 is removed from the holding groove 89 of the stopper 85, so the holder 40 may freely move in the second direction D2.

The lever 87 of the stopping unit drives the stopper 85 to cause and release the holding of the stopping piece 81.

According to an embodiment, when the gripper 60 moves to the position of the holder 40 and grips the storage container 20 seated in the holder 40, the suspensor 70 is configured to press the lever 87.

In addition, the lever 87 is axially rotated clockwise to elastically compress the elastic body 83 when the lever 87 is pressed by the suspensor 70, and is axially rotated counter-clockwise by the elastic restoring force of the elastic body 83 to perform a restoring operation when the pressing is released.

In this case, when the lever 87 is pressed by the suspensor 70, the stopper 85 moves downward in conjunction with the clockwise axial rotation of the lever 87, and the holding state of the stopping piece 81 is released, so the corresponding holder 40 may move in the second direction D2.

Accordingly, in the state in which the suspensor 70 presses the lever 87, when the gripper 60 moves a prede-termined distance further in the second direction D2, the suspensor 70 is configured to move out of the position of the lever 87 and eventually release the state of pressing the lever 87.

In addition, when the pressing of the lever 87 by the suspensor 70 is released, the stopper 85 is configured to be restored to an original position thereof by being moved upward by the elastic restoring force of the elastic body 83.

In addition, when the stopper 85 is restored to the original position, the stopping piece 81 of another holder 40 is inserted into the holding groove 89 of the stopper 85 and is in the above-mentioned holding state.

The removal prevention unit of the present disclosure is a component that restrains the food-ingredient storage container seated in the holder from being removed from the holder or from being moved upward and downward due to external impacts or the tilting of the apparatus.

The removal prevention unit includes a support rod 90 and a pressing member 91.

The support rod 90 of the removal prevention unit is a rod-shaped member installed vertically above the infinite track unit in a direction crossing the infinite track unit (i.e., in the X-axis direction X1).

The support rod 90 is formed to have elasticity. For example, the support rod 90 may be formed of an elastic material such as carbon.

The pressing member 91 of the removal prevention unit is a member that is coupled to the support rod 90 and presses the food-ingredient storage container seated by the holder in a downward direction. According to an embodiment, the pressing member 91 may be formed in a rod or strip shape.

According to the removal prevention unit, the food-ingredient storage container, which is seated on the chain by the holder, is pressed by the pressing member 91 located vertically above the food-ingredient storage container, and the pressing member 91 may move up and down within a predetermined range due to the elasticity of the support rod 90.

Accordingly, even while the food-ingredient storage container is being pressed by the pressing member 91, the movement of the food-ingredient storage container in the second direction caused by the gripper may be performed, and the storage container may be prevented from being removed from the holder or being moved up and down due to external impacts or the tilting of the apparatus in the moving process and standby state.

Hereinafter, the operation of the robot arm 50 to withdraw the food-ingredient storage container and provide the food-ingredient storage container to the outside will be described in time series order.

(1) Food-ingredient storage containers are disposed in each of infinite track units configured in multiple rows and layers through the inlet of the main body. That is, the food-ingredient storage containers are respectively disposed in the holders 40 mounted on the chain 31 of the infinite track unit.

Accordingly, the multiple storage containers 20 are seated in the pairs of multiple holders 40, respectively, and are placed by being arranged side by side on the chain 31 along the longitudinal direction of the chain 31 as a whole.

For example, a storage container containing a first food ingredient may be arranged on an infinite track unit on each of first, second, and third floors in a first row, a storage container containing a second food ingredient may be arranged on an infinite track unit on each of first, second, and third floors in a second row, and a storage container con-taining a third food ingredient may be arranged on an infinite track unit on each of first, second, and third floors in a third row.

(2) When the order of a customer is entered, an infinite track unit (hereinafter, referred to as 'a first infinite track unit') on which a food-ingredient storage container (here-inafter, referred to as 'a first storage container') for cooking corresponding ordered food is located is specified, and the robot arm 50 begins the operation of approaching the first infinite track unit through 3-axis movement.

(3) Through the three-axis movement of the robot arm 50, the gripper 60 reaches the position of the first storage container located at the front (i.e., a forefront) of the first infinite track unit and then grips the first storage container. That is, the first storage container corresponds to a container placed at the foremost end among multiple storage containers arranged in the first infinite track unit.

In this case, when the gripping of the first storage container by the gripper 60 is completed, the suspensor 70 faces the holding protrusion 41 formed on the holder (hereinafter, referred to as 'the first holder') in which the first storage container is seated.

(4) When the robot arm 50 moves backward in the Z-axis direction Z1 after the gripper 60 completes the operation of gripping the first storage container, the movement of the gripper 60 in the second direction D2 occurs. In this case, since the suspensor 70 moves in the second direction D2 while being held by the holding part 41, the external force of the second direction D2 is applied to the holding part 41, and due to this external force, the first holder, which is formed integrally with the holding part 41, is also forcibly moved in the second direction D2.

In addition, when the first holder is forcibly moved in the second direction D2, the chain 31, which is coupled to the first holder, also rotates in conjunction with the movement of the holder in the second direction D2. In addition, the first storage container seated in the first holder is also transferred to the second direction D2.

(5) When the first holder supporting the first storage container moves in the second direction D2 and reaches the aforementioned specific point (i.e., the holding-release point) of the infinite track unit, the chain 31 is moved rotationally by the first pulley 33, and accordingly, the first holder coupled to the chain 31 also begins to move downward.

In this case, when the first holder moves downward, the holding protrusion (i.e., the holding protrusion by the suspensor 70 is held) formed on the first holder is in the state of capable of passing through the holding-release groove 73.

(6) When the gripper 60 moves further in the second direction D2 after the first holder reaches the holding-release point, the operation of the holding protrusion 41 passing through the holding-release groove 73 occurs, and accordingly, the suspensor 70 moves in the second direction D2 while the holding operation thereof is released.

In addition, in this state, when the gripper 60 moves further in the second direction D2, the first storage container is completely withdrawn from the infinite track unit.

Next, through the axial rotation and X-axis directional movement of the robot arm 50, the robot arm 50 transports the first storage container gripped by the gripper 60 to the outlet and provides the first storage container to a cook, such as a human or robot.

Meanwhile, when the first storage container is completely taken out through the operation described above, a second storage container placed directly behind the first storage container is moved and located at the forefront of the first infinite track unit. That is, among the multiple storage containers placed in the first infinite track unit, the second storage container is placed at the foremost end.

Next, when another order is entered and the second storage container needs to be taken out, the second storage container is taken out and supplied to a cook in the same manner as described above.

According to the automatic supply apparatus for a food-ingredient storage container of the present disclosure as described above, the force of the gripper 60 pulling the corresponding storage container to pull out the food-ingredient storage container may act as the rotational power of the chain 31. After all, even if a separate power device such as a drive motor is not installed on each conveyor (i.e., the infinite track unit), the rotational movement of the chain 31 and the transfer of the storage container may be performed.

In addition, it is possible to take out food-ingredient storage containers automatically in the method of arranging the containers horizontally and withdrawing the containers sequentially instead of the method of stacking the containers in a height direction and withdrawing a container on the lowest end, thereby enabling a robot arm to withdraw and move a container containing food ingredients by gripping the container easily and accurately when starting to cook food.

Accordingly, when there is an order from a customer, a container containing food ingredients for cooking a corresponding ordered food can be automatically taken out and moved to be supplied to a cook such as a person or robot, thereby enabling the corresponding ordered food to be rapidly cooked and supplied, and significantly decreasing manpower for food cooking.

Meanwhile, in order to ensure that food-ingredient storage containers can be sequentially and automatically transferred to a position at which a robot can most efficiently grip a storage container, it is most advantageous to move the food-ingredient storage containers in the method of using conveyors. However, in order to operate the conveyors, it is generally necessary to install a power device, including a drive motor, in each of the conveyors.

However, according to the automatic supply apparatus for a food-ingredient storage container of the present disclosure, the force of the gripper 60 pulling the corresponding storage container to pull out the food-ingredient storage container may act as the rotational power of the chain 31. As a result, even if a separate power device such as a drive motor is not installed on each conveyor (i.e., the infinite track unit), the rotational movement of the chain 31 and the transfer of the storage container may be performed, thereby significantly reducing apparatus manufacturing costs.

Although preferred embodiments of the present disclosure have been described and illustrated above by using specific terms, such terms are only intended to clearly describe the present disclosure, and it is obvious that various changes and modifications may be made to the embodiments and described terms of the present disclosure without departing from the technical spirit and scope of the following claims. These modified embodiments should not be understood individually from the spirit and scope of the present disclosure, but fall within the scope of the claims of the present disclosure.

What is claimed is:

1. An automatic supply apparatus for a food-ingredient storage container, the apparatus comprising:

an infinite track unit comprising a chain or a belt (hereinafter, collectively referred to as 'the chain') configured to be capable of performing a rotational movement in an infinite track manner;

multiple holders configured to be connected to the chain and to move together with the chain, with multiple holders allowing food-ingredient storage containers to be respectively seated therein;

a holding part formed on each of the holders;

a gripper configured to be capable of gripping each of the food-ingredient storage containers seated by the holder;

a robot arm configured to move the gripper in a first direction and in a direction (hereinafter, referred to as 'a second direction') opposite to the first direction; and a suspensor formed on the gripper and configured to move together with the gripper, wherein the suspensor is held by the holding part when the gripper moves in the second direction while the gripper grips the food-ingredient storage container, wherein the holder is configured to be forcibly moved in the second direction by an external force applied to the holding part by the suspensor when the suspensor moves in the second direction while the suspensor is held by the holding part, the chain is configured such that the rotational movement of the chain is generated in conjunction with the movement of the holder in the second direction during the movement of the holder in the second direction, and the suspensor is configured such that the holding operation of the suspensor is released when the holder moves in the second direction and reaches a specific point.

2. The apparatus of claim 1, wherein the holding part comprises a holding protrusion protruding from a side of the holder in a form of a protrusion, the suspensor is configured such that the holding operation of the suspensor is performed by the holding protrusion when the gripper moves in the second direction while the gripper grips the food-ingredient storage container, and the holder is forcibly moved in the second direction by an external force applied to the holding protrusion by the suspensor when the suspensor moves in the second direction while the suspensor is held by the holding protrusion.

3. The apparatus of claim 2, wherein the suspensor comprises:

a body part formed as a structure extending downward from one region of the gripper and allowing the holding operation to be performed by the holding protrusion; and a holding-release groove formed in a lower portion of the body part in a form of a long groove through which the holding protrusion is capable of passing, the holding protrusion is in a state in which the holding protrusion is capable of passing through the holding-release groove when the holder reaches the specific point, and the suspensor moves in the second direction while the holding operation of the suspensor is released since the holding protrusion passes through the holding-release groove when the holder reaches the specific point.

4. The apparatus of claim 3, wherein the specific point is a point located in a region in which the holder completes a horizontal movement of the second direction caused by the suspensor and moves downward.

5. The apparatus of claim 1, wherein even if the suspensor moves in the second direction while the holding operation is released, the holder and the chain are stationary without moving.

6. The apparatus of claim 3, wherein the holding-release groove is formed in the form of the long groove extending in a transverse direction of the body part in the lower portion of the body part, with a first end part of the long groove having a first opening formed to be open and a second end part thereof having a second opening formed to be open, and when the holder moves further in the second direction after the holder reaches the specific point, the holding protrusion moves into the holding-release groove through the first opening, passes through the inside of the holding-release groove, and then moves out of the holding-release groove through the second opening.

7. The apparatus of claim 3, wherein the holding protrusion is formed in a shape with a circular cross-section, wherein a width of the holding-release groove is larger than a diameter of the circular cross-section.

8. The apparatus of claim 1, further comprising:

a stopping unit configured to stop the movement of the holder, wherein the stopping unit comprises:

a stopping piece protruding in a form of a protrusion on a lower surface of the holder;

an elastic body configured to perform elastic compression and a restoring operation;

a stopper configured to prevent the holder from moving in the first and second directions by causing a holding state of the stopping piece; and a lever configured to be axially rotated clockwise to elastically compress the elastic body when pressed by the suspensor and to be axially rotated counterclockwise by an elastic restoring force of the elastic body to perform a restoring operation when the pressing is released, wherein the stopper is configured to:

move downward in conjunction with the clockwise axial rotation of the lever when the lever is pressed by the suspensor; and to be restored to an original position thereof by the elastic restoring force of the elastic body when the pressing of the lever by the suspensor is released, the suspensor is configured to:

press the lever when the gripper moves to a position of the holder and grips the storage container seated in the holder, and release the state of pressing the lever when the gripper moves a predetermined distance in the second direction while the suspensor presses the lever, and the stopping unit is configured to release the holding state of the stopping piece by the stopper moving downward when the lever is pressed by the suspensor.

9. The apparatus of claim 1, further comprising:

a main body, wherein the main body is capable of sealing an internal space thereof from the outside, wherein the internal space is provided with space to accommodate the infinite track unit, he holder, the robot arm, and the gripper, an inlet is formed to be open in one region of the main body to bring the food-ingredient storage container into the internal space, and an outlet is formed to be open in another region of the main body to take the food-ingredient storage container withdrawn by the robot arm out of the internal space.

10. The apparatus of claim 1, further comprising:

a removal prevention unit configured to prevent removal and movement of the food-ingredient storage container, wherein the removal prevention unit comprises:

a rod-shaped support rod installed vertically above the infinite track unit and formed to have elasticity; and a pressing member configured to be coupled to the support rod and to downward press the food-ingredient storage container seated by the holder.

* * * * *